US008221232B2

(12) United States Patent
Inubushi et al.

(10) Patent No.: US 8,221,232 B2
(45) Date of Patent: Jul. 17, 2012

(54) GAME SYSTEM

(75) Inventors: Takashi Inubushi, Tokyo (JP); Masayuki Komatsu, Tokyo (JP); Yoshihiko Narita, Tokyo (JP); Tadashi Minamino, Tokyo (JP); Hiroshi Naraoka, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 486 days.

(21) Appl. No.: 11/534,311

(22) Filed: Sep. 22, 2006

(65) Prior Publication Data

US 2007/0077999 A1 Apr. 5, 2007

(30) Foreign Application Priority Data

Sep. 22, 2005 (JP) ................................ 2005-276245

(51) Int. Cl.
*A63F 13/00* (2006.01)

(52) U.S. Cl. .............................................. 463/29; 463/9

(58) Field of Classification Search .................... 463/29, 463/6, 9, 23, 40, 42
See application file for complete search history.

(56) References Cited

U.S. PATENT DOCUMENTS 5,570,887 A * 11/1996 Christie, Jr. ................... 273/261
6,659,873 B1 * 12/2003 Kitano et al. ................... 463/42
7,465,231 B2 * 12/2008 Lewin et al. .................... 463/37
2002/0128056 A1 9/2002 Kato
2004/0127287 A1 * 7/2004 Takahashi et al. .............. 463/42
2004/0147322 A1 * 7/2004 Okada ............................. 463/42
2004/0235563 A1 * 11/2004 Blackburn et al. .............. 463/29
2005/0070355 A1 * 3/2005 Shimizu .......................... 463/23
2006/0003826 A1 * 1/2006 Walker et al. ...................... 463/9
2006/0046809 A1 * 3/2006 Hiranoya et al. .................. 463/9
2006/0142085 A1 * 6/2006 Kim ................................ 463/42
2006/0148546 A1 * 7/2006 Inoue et al. ........................ 463/6
2006/0205509 A1 * 9/2006 Hirota ............................. 463/40

FOREIGN PATENT DOCUMENTS

JP 2001-187266 A 7/2001
JP 2001314656 A 11/2001
JP 2001318872 A 11/2001
JP 2001-353373 A 12/2001

OTHER PUBLICATIONS

Patent Abstracts of Japan for JP2001-353373 published Dec. 25, 2001.
Patent Abstracts of Japan for JP2001-187266 published Jul. 10, 2001.

* cited by examiner

*Primary Examiner* — Dmitry Suhol
*Assistant Examiner* — Ankit Doshi
(74) *Attorney, Agent, or Firm* — Edwards Wildman Palmer LLP; Peter C. Schechter; Brian R. Landry

(57) ABSTRACT

To provide a game system which improves a sense of being a member when a plurality of game machines are grouped. In a game system, in which each of a plurality of game machines G is sorted to any one group TTT and a game using a game element R is played among a plurality of game machines G, the game machine G obtains the evaluation to the content of the play of the game and a server CS updates registered group information 41 representing a group TTT holding the game element R into a group of the game machine G that obtained the evaluation when the evaluation and registered evaluation 43 stored related to the game element R meet a predetermined condition.

20 Claims, 17 Drawing Sheets

FIG. 2A

| | SHOPTTT1 | SHOPTTT2 | SHOPTTT3 | SHOPTTT4 |
|---|---|---|---|---|
| WRESTLER A | 120 | 150 | 140 | |
| WRESTLER B | 100 | 150 | | 130 |
| WRESTLER C | 90 | | 150 | |
| . | | | | |
| . | | | | |
| . | | | | |

FIG. 2B

| | SHOPTTT1 | SHOPTTT2 | SHOPTTT3 | SHOPTTT4 |
|---|---|---|---|---|
| WRESTLER A | 120 | 150 | 140 | 200 |
| WRESTLER B | 100 | 150 | | 130 |
| WRESTLER C | 90 | | 150 | |
| . | | | | |
| . | | | | |
| . | | | | |

FIG. 6A

20

| | | |
|---|---|---|
| | WRESTLER ID | A0001 (21) |
| 22 | POWER | 16 |
| 23 | SPEED | 10 |
| 24 | TECHNIQUE | 10 |
| 25 | TOUGHNESS | 10 |
| 26 | STAMINA | 100 |

FIG. 6B

30

| | | |
|---|---|---|
| | TECHNIQUE ID | B0001 (31) |
| 32 | POWER | 10 |
| 33 | SPEED | 20 |
| 34 | TECHNIQUE | 10 |
| 35 | HIGHEST DAMAGE DEGREE | 100 |
| 36 | CONSUMPTION COST | 2 |
| 37 | LEVEL | 1 (SMALL TECHNIQUE) |

FIG. 7

40

| WRESTLER ID (21) | REGISTERED SHOP ID (41) | REGISTERED ASSOCIATION (42) | REGISTERED FEVER DEGREE (43) |
|---|---|---|---|
| WRESTLER A | SHOPTTT2 | PP PROWRES | 150 |
| WRESTLER B | SHOPTTT2 | EX PROWRES | 200 |
| WRESTLER C | SHOPTTT1 | FF PROWRES | 180 |
| WRESTLER D | SHOPTTT3 | QQ PROWRES | 250 |
| . | . | . | . |
| . | . | . | . |
| | | | |
| | | | |

FIG. 8

50

51

| SHOP ID | THE NUMBER OF OBTAINED WRESTLERS |
|---|---|
| SHOPTTT1 | 10 |
| SHOPTTT2 | 8 |
| SHOPTTT3 | 7 |
| SHOPTTT4 | 5 |
| . | . |
| . | . |
| | |
| | |

FIG. 16A

40

| WRESTLER ID | REGISTERED SHOP ID | REGISTERED ASSOCIATION | REGISTERED FEVER DEGREE |
|---|---|---|---|
| WRESTLER A | SHOPTTT4 | PP PROWRES | 200 |
| WRESTLER B | SHOPTTT2 | EX PROWRES | 200 |
| WRESTLER C | SHOPTTT1 | FF PROWRES | 180 |
| WRESTLER D | SHOPTTT3 | QQ PROWRES | 250 |
| . | . | . | . |
| . | . | . | . |
| | | | |
| | | | |

FIG. 16B

50

| SHOP ID | THE NUMBER OF OBTAINED WRESTLERS |
|---|---|
| SHOPTTT1 | 10 |
| SHOPTTT2 | 7 |
| SHOPTTT3 | 7 |
| SHOPTTT4 | 6 |
| . | . |
| . | . |
| | |
| | |

GAME SYSTEM

INCORPORATION BY REFERENCE

The present application claims priority under 35 U.S.C. §119 to Japanese Patent Application No. 2005-276245 filed on Sep. 22, 2005. The content of the application is incorporated herein by reference in its entirety.

BACKGROUND OF THE INVENTION

1. Field of the Invention

The present invention relates to a game system performed among a plurality of game machines connected to a server.

2. Description of the Related Art

In games where a score to be added or deducted based on a predetermined rule is calculated, a type of game of trying conclusions due to a finally obtained score has been well known, and there is also a game system where not only a score of game is calculated but also an evaluation value is calculated by evaluating player's operation (for example, refer to Japanese Patent Application Laid-Open Nos. 2001-187266 and 2001-353373).

However, conventionally, the victory or defeat of the game and the evaluation value of the game are only reflected to a player who played the game. As a result, for example, even if a plurality of game machines is grouped based on a predetermined condition, a conclusion of victory or defeat and a conclusion of evaluation are not reflected on a group, so that a sense of being a member of a group cannot be improved.

SUMMARY OF THE INVENTION

Therefore, it is an object to provide a game system which improves a sense of being a member of a group when a plurality of game machines are grouped.

The present invention provides a game system, in which each of a plurality of game machines connected to a server is sorted to any one of a plurality of groups and a game using at least one game element is played among the plurality of game machines, wherein each of the plural game machines having: a game machine storing device for storing group information representing the group and game element information representing the game element; a game control device for controlling the game using the game element; an evaluating device for obtaining an evaluation to a content of play of the game based on a predetermined evaluation criterion; and a game machined at a transmitting device for transmitting game machine data including the group information, the game element information, and the obtained evaluation to the server; the server having: a game machine data receiving device for receiving the game machine data from each of the game machines; a registered data storing device for storing the game element information, registered group information representing the group holding a game element represented by the game element information, and a registered evaluation which is the evaluation obtained by any game machine of the group represented by the registered group information being related to each other; and a registration updating device for updating the registered evaluation and the registered group information into the evaluation and the group information included in the game machine data respectively when the registration evaluation related to the game element information included in the game machine data stored in the registered data storing device and the evaluation included in the game machine data satisfy a predetermined condition. Thus, the game system according to the present invention solves the problem.

According to the present invention, when the evaluation obtained based on the content of play satisfies the predetermined condition with respect to the registered evaluation which is the evaluation of the group having the game element, the game information of the game machine where the play was made can be updated as the registered group information. As a result, the group having the game element can be changed due to the evaluation. In other words, the unit of group completes for obtaining the game element by the evaluation of the content of play. Thereby, one common sense can be formed within a group and a sense of being a member of a group can be improved for the players in the same group. For example, by distributing the belonging information of game element and giving a predetermined special privilege to the group holding the game element based on the content stored in the registered data storing device, the sense of being a member of group can be improved.

For example, a plurality of game machines is grouped depending on a place where the game machines are placed or depending on a manager of game machine regardless of places where game machines are installed. In grouping due to a place where the game machines are installed, there is a case where a facility where the game machines are installed is made as one group or a care where the game machines are grouped depending on an address or a post code. The evaluation by the evaluating device also includes a mark or a letter having a specific meaning or the like as well as a numeric value. As a predetermined condition, other condition can be added to the condition with regard to a magnitude relation or a strong and weak relation between two evaluations. The evaluation of the content of play includes a score obtained in the game, the evaluation with respect to the operation content of the player, and the result of victory or defeat.

The game may be a battle game; the game machine may have an operation object setting device for setting the game element as an operation object of the game machine itself; the game control device may control the battle game that the game element of the operation object battles with the game element of the operation object of other game machine; and the evaluation by the evaluating device may be an evaluation to a content of play different from victory or defeat of the game.

Thereby, due to the evaluation of the content of play that is different from victory or defeat of the game, it is possible to obtain the game element. In the case where the game element can be obtained depending on the number of victories, the group having a lot of number of plays has advantage, or in the case where the game element can be obtained depending of the victory ratio, the group having high victory ratio may stop playing the game. Therefore, especially for a game where a player can enjoy the content of play more than victory or defeat, it sometimes happen that the player does not enjoying the game. However, in the case where the player is evaluated depending on the content of play different from victory or defeat, the player can try to get a higher evaluation while enjoying the play, so that willingness to play of the player can be improved. For example, the game may be a professional wrestling game and the evaluation by the evaluating device may be an evaluation to a content of play in the professional wrestling game.

The game machine may have a game machine processing device for carrying out predetermined processing when the group information of the group in which the game machine itself is included is stored in the registered group information with reference to the registered data storing device of the server. In addition, the server may have a group processing device for carrying out predetermined processing with respect to the game machine included in the group which is represented by the registered group information. Thereby, a special processing can be made with respect to the game machine of the group holding the game element, so that a predetermined special privilege can be given to the game machine and this makes it possible to further improve willingness to obtain a game element of the player.

Each of the game machines may be a game machine for commercial use and the group may be a shop where at least one game machine is installed. Thereby, a game system holding a game element can be provided for each shop and one common sense in a shop can be given to a player. Accordingly, enthusiasms for each shop can be expected and this enthusiasm can be reflected on the ability to pull in customers.

As described above, according to the present invention, when the registered group information holding the game element is stored together with a registration evaluation and the evaluation with respect to the content of play of the game and the registered evaluation meet a predetermined condition, by updating the registered group information and the registered evaluation into the group information of the group that made the play and the evaluation with respect to that play, when a plurality of game machines are grouped, it is possible to provide a game system which can improve a sense of being a member of group.

BRIEF DESCRIPTION OF THE DRAWINGS

FIGS. 2A and 2B are conceptual illustrations for explaining a shop to which a wrestler A belongs;

FIG. 6A is a view showing wrestler information in the present embodiment and FIG. 6B is a view showing technique information in the present embodiment;

FIG. 7 is a view showing shop registered information in the present embodiment;

FIG. 8 is a view showing information for shop in the present embodiment;

FIG. 16A is a view showing a state that the shop registered information is updated and FIG. 16B is a view showing a state that the information for shop is updated.

DETAILED DESCRIPTION OF THE INVENTION

Figure 1:
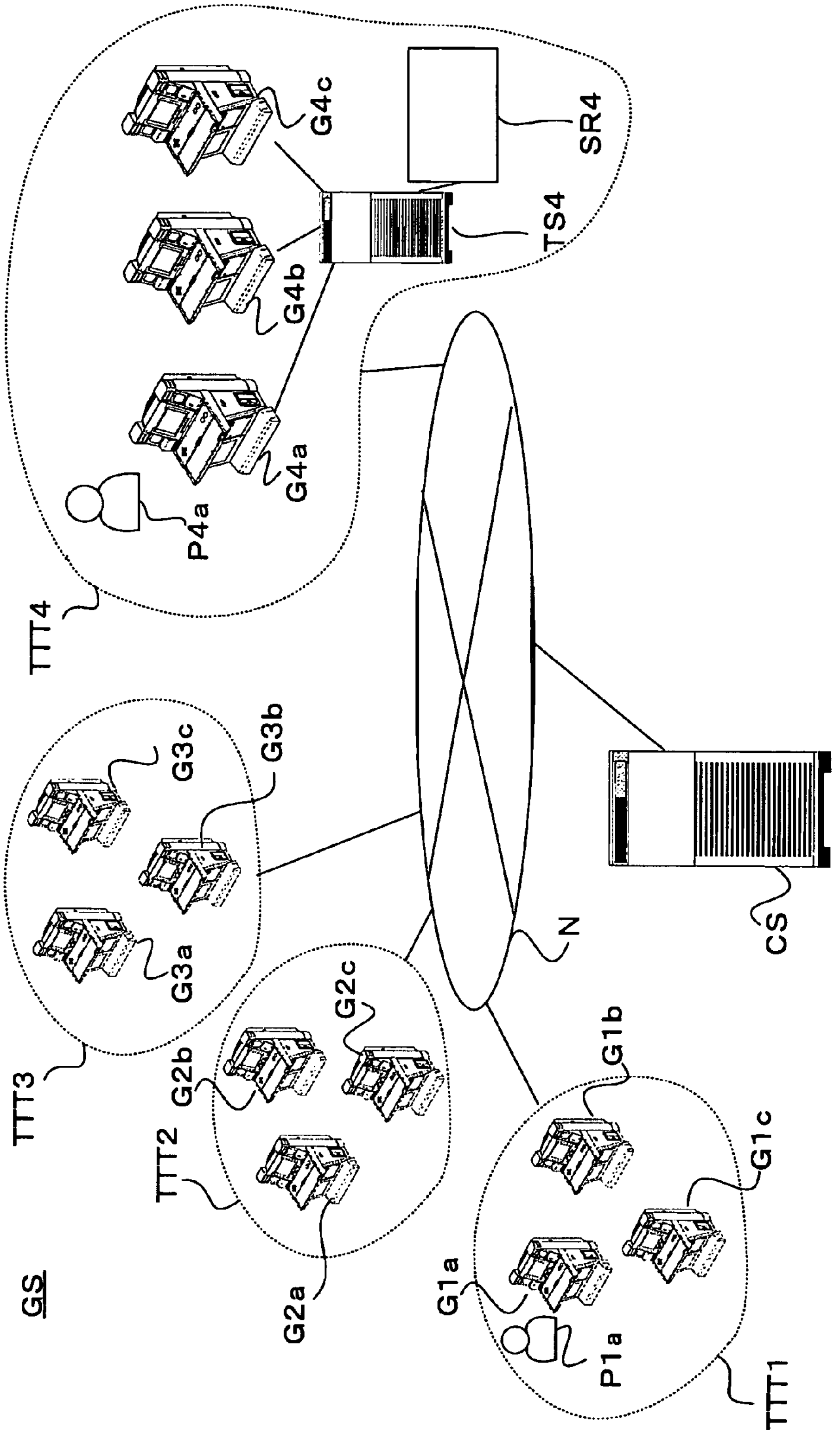
FIG. 1 is a view showing an example of a game system GS according to the present invention.

FIG. 1 is a view showing an example of a game system GS according to the present invention. In the game system GS, a plurality of game machines G1*a* . . . G1*c*, G2*a* . . . G2*c*, G3*a* . . . G3*c*, and G4*a* . . . G4*c* are connected to a center server machine CS via a communication network N so as to be capable of transmitting and receiving the data. Hereinafter, when there is no necessity to particularly distinguish the game machines G1*a* . . . G4*a*, these game machines are referred to as "a game machine G". The communication network N in the present embodiment uses a public line such as the Internet. Each game machine G and the center server machine CS have a unique address and by using this address, the data will be transmitted and received.

The game machines G1*a* . . . G1*c* are installed at a shop TTT1, the game machines G2*a* . . . G2*c* are installed at a shop TTT2, the game machines G3*a* . . . G3*c* are installed at a shop TTT3, and the game machines G4*a* . . . G4*c* are installed at a shop TTT4. At each shop, as shown in the shop TTT4, the game machines G4*a* . . . G4*c* are connected to the network N via a shop server TS4. The shop server TS4 controls a center screen SR4 installed in the shop TTT4 as well as regulates transmission and reception of data with the center server machine CS via the communication network N.

With respect to other shops TTT1, TTT2, and TTT3, shop servers TS1, TS2, TS3 and center screens SR1, SR2, and SR3 are installed, respectively in the same manner as the shop TTT4; however, the illustration thereof is herein omitted. When there is no necessity to particularly distinguish the shops TTT1 . . . TTT4, these shops are referred to as "a shop TTT". In addition, when there is no necessity to particularly distinguish the shop servers TS1 . . . TS4 and the center screens SR1 . . . SR4, they are referred to as "a shop server TS" and "a center screen SR", respectively.

FIG. 1 only shows a manner that a player P1*a* operates the game machine G1*a* and a player P4*a* operates the game machine G4*a*; however, each of the game machines G1*a* . . . G4*c* is operated by the players P1*a* . . . P4*c*, respectively. Hereinafter, when there is no need to particularly distinguish the players P1*a* . . . P4*c*, these players are referred to as "a player P".

The player P who operates the game machine G is refereed to as "the player P of the game machine G" and the game machine G to be operated by the player P is refereed to as "the game machine G of the player P". Further, in the following explanation, the description of the shop server TS is omitted in the description of transmission and reception of data to be performed between the game machine G and the center server machine CS.

In the game system GS according to the present invention, respective players P of two game machines G are combined as an opponent and by using a card owned by each player, a wrestling game is played. The player P operates actions of a wrestler as a game element. The shop TTT where the game machine G having a higher fever degree in the game is installed can obtain the wrestler operated by this game machine G. The fever degree is acquired by quantifying the evaluation with respect to the operation selected by the player P and sufficiency level of contents of a match is represented by high and low of the fever degree. A method to evaluate the fever degree will be described later. Hereinafter, the state that the shop TTT possessing the wrestler is sometimes called as that the wrestler belongs to the shop TTT.

For example, as shown in FIG. 2A, at the moment when the wrestler A belongs to the shop TTT2 of the game machine G performing the fever degree 150 due to the operation of the player P who selects the wrestler A, if the game machine G performs the fever degree 200 in the game due to the operation of the player P who selects the wrestler A as shown in FIG. 2B, this results in that the wrestler A belongs to the shop TTT4. To this shop TTT4 to which the wrestler A belongs, a special privilege will be given relevant to this wrestler A.

Figure 3:
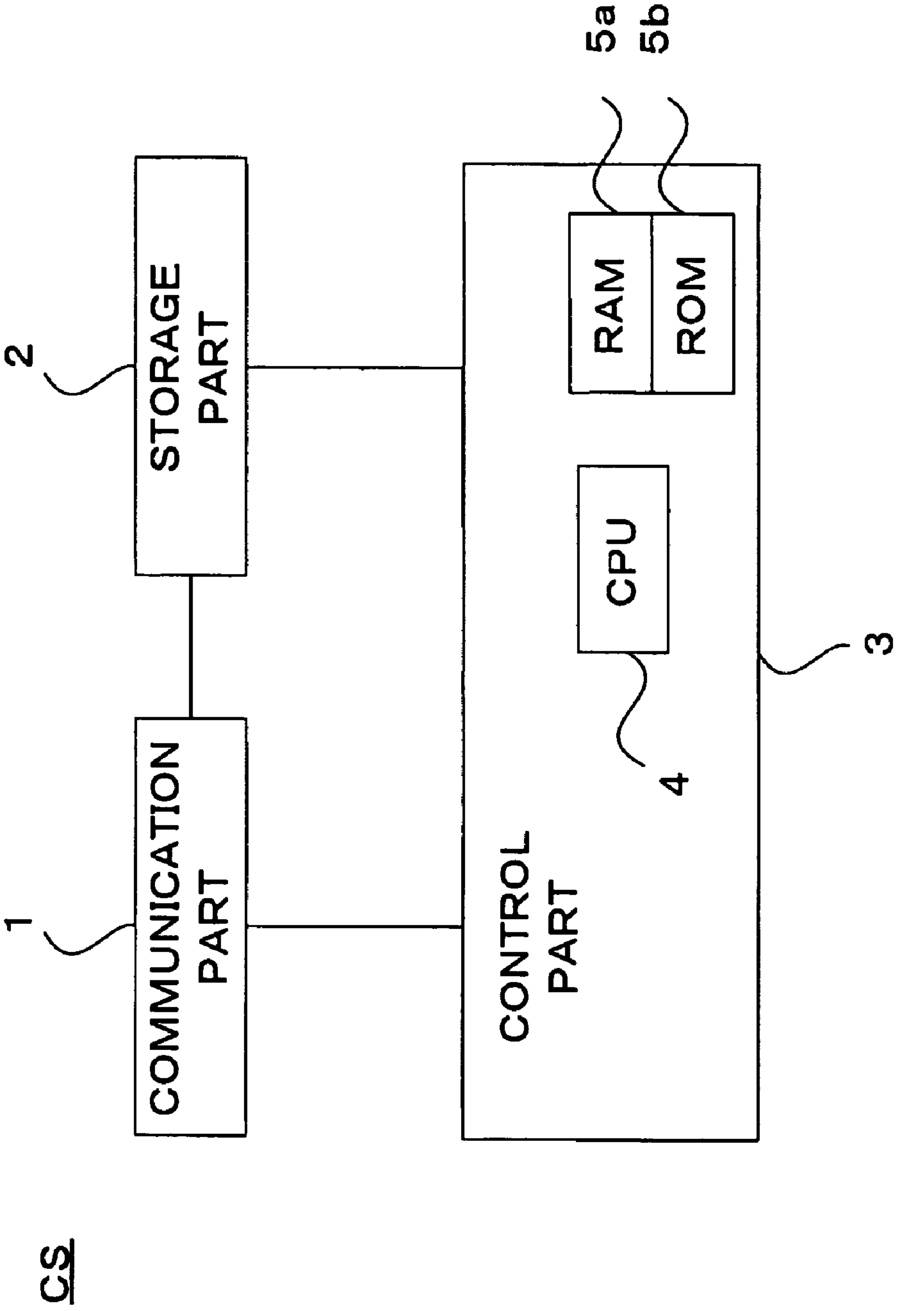
FIG. 3 is a block schematic diagram of a center server machine.

The center server machine CS carries out transmission and reception of various data relevant to the game according to a request from the game machine G as well as carries out various update processing to be described later. The schematic structure of the center server machine CS is shown in FIG. 3. The center server machine CS has a communication part 1 to carry out transmission and reception of the data with the game machine G, a storage part 2, and a control part 3 to control each part of the center server machine CS. The control part 3 is configured as a computer which is provided with a CPU 4 and various peripheral circuits such as a RAM 5*a* and a ROM 5*b* necessary for the operation of the CPU 4. The ROM 5*b* holds a program for executing the present invention.

Further, the storage part 2 is a temporal storage area and a configuration may be applied to the present invention that data while not being used is held by a data base connected via the network N. The data stored in the storage part 2 will be described later.

Figure 4:
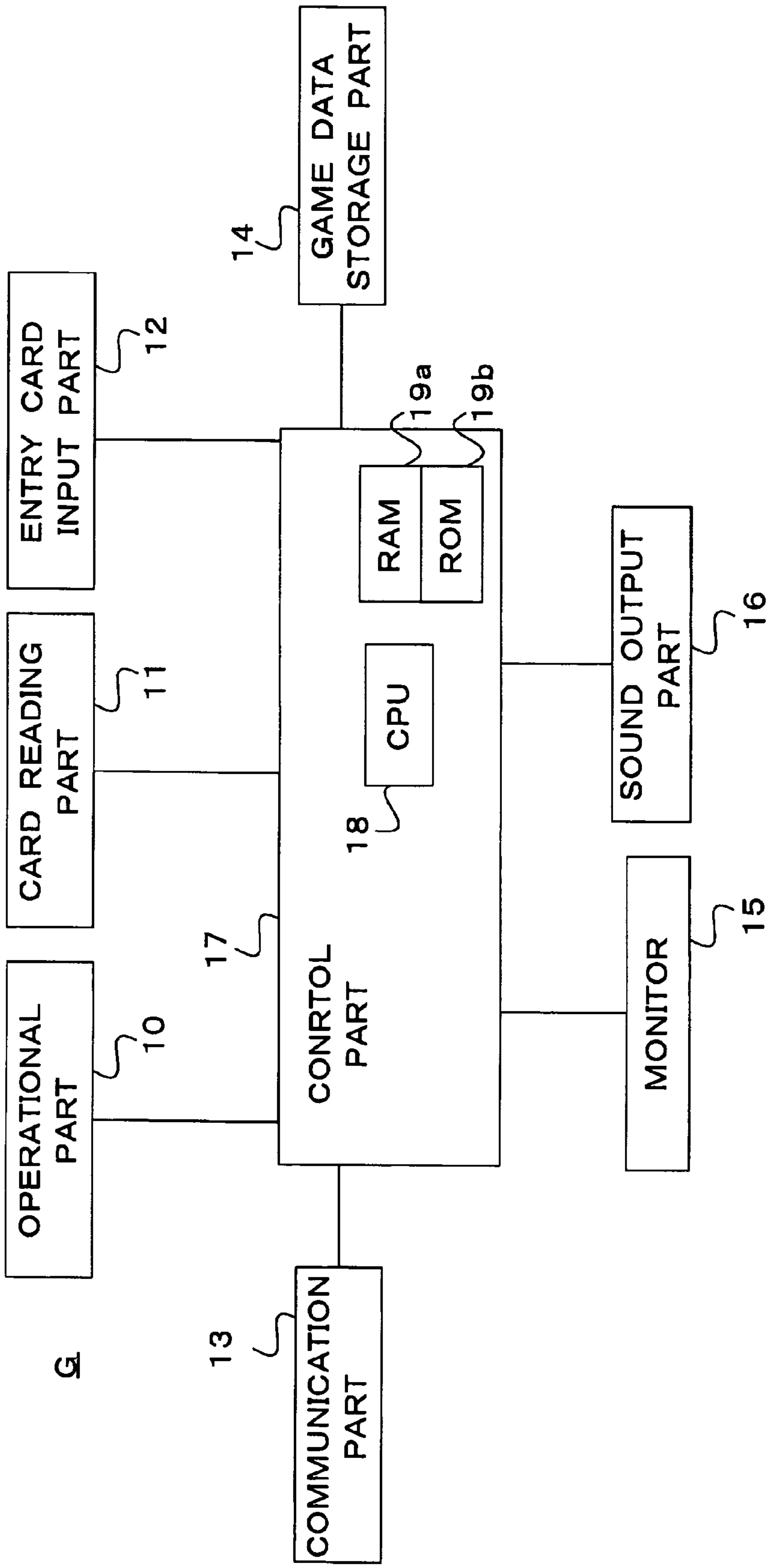
FIG. 4 is a block schematic diagram of a game machine.

The game machine G plays a professional wrestling game with other game machine G which is combined by the center server machine CS. The schematic structure of the game machine G is shown in FIG. 4. The game machine G has an operational part 10 including various levers and buttons or the like to be operated by the player P; a card reading part 11 to read the data of a card which is appropriately used by a player when playing a game; an entry card input part 12 to insert an entry card upon entry; a communication part 13 to carry out transmission and reception of data with the center server machine CS and other game machine G; a game data storage part 14 to hold various data; a monitor 15 to present a progress of the game and various messages to the player; a sound output part 16 to output various sound effects; and a control part 17 to control the operations of respective parts in the game machine G.

The control part 17 is configured as a computer, which is provided with a CPU 18 and various peripheral circuits such as a RAM 19*a* and a ROM 19*b* necessary for the operation of the CPU 18. In the ROM 19*b*, a program for executing the present invention is stored. In the game data storage part 14, the data relevant to the game such as various tables to be described later is held and a shop ID as the group information unique to the shop where the game machine G is installed is held. Thereby, the game data storage part 14 functions as game machine storing device. The operational part 10 is provided with a fall button to designate a fall to be described later.

Figure 5:
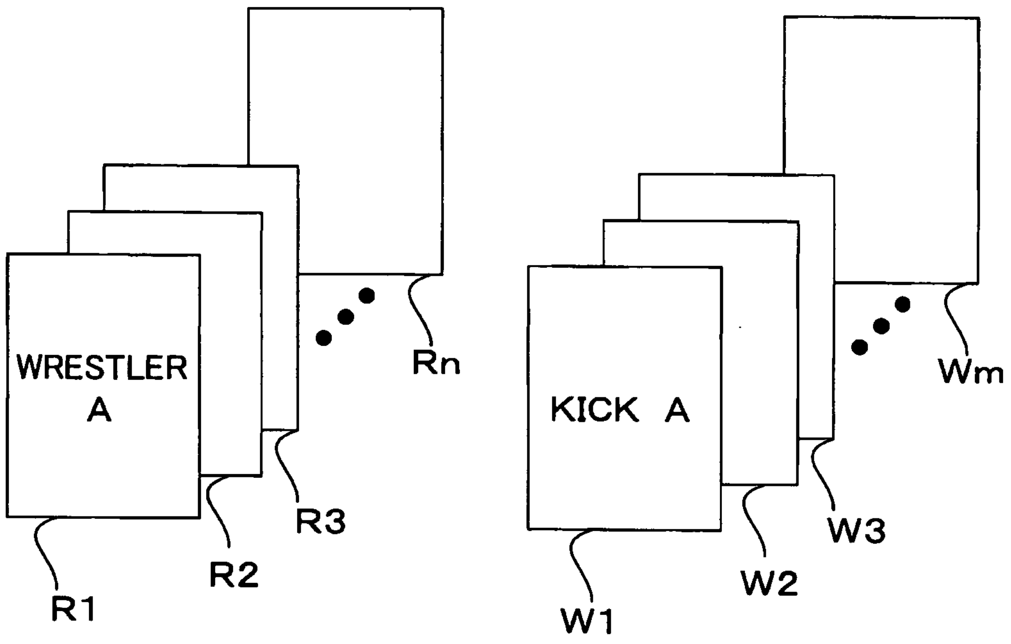
FIG. 5 is a view showing wrestler cards and technique cards to be used in a game by a player.

The card used by the player P in the game in the present embodiment includes wrestler cards R1 . . . Rn and technique cards W1 . . . Wm as shown in FIG. 5. These cards can be obtained by purchase or as a reward of a game, for example. Hereinafter, when there is no need to particularly distinguish the wrestler cards R1 . . . Rn and the technique cards W1 . . . Wm, these cards are referred to as "a wrestler card R" and "a technique card W", respectively. In addition, the wrestler corresponding to the wrestler card Rn is referred to as the wrestler Rn and the technique corresponding to the technique card Wm is referred to as the technique Wm. Further, when there is no need to particularly distinguish the wrestler R1 . . . Rn and the technique W1 . . . Wm, these cards are referred to as "a wrestler R" and "a technique W", respectively.

A wrestler ID unique to the wrestler R is stored in the wrestler card R, and a technique ID unique to the technique W is stored in the technique card W. In the game, the player P can designate the wrestler R to the game machine G by reading the wrestler card R by means of the card reading part 11 and the player P can designate the technique W to the game machine G by reading the technique card W by means of the card reading part 11. Hereinafter, to read the wrestler card by means of the card reading part 11 is referred to as "to designate the wrestler R" and to read the technique card W by means of the card reading part 11 is referred to as "to designate the technique W".

The data stored in the storage part 2 of the center server machine CS will be described with reference to FIGS. 6 to 9. The data fixed in common in the game system GS includes wrestler information 20 which is the information relevant to each wrestler R and technique information 30 which is the information relevant to each technique. As shown in FIG. 6A, in the wrestler information 20, each value of a power 22, a speed 23, a technique 24, a toughness 25, and a stamina 26, which are battle parameters of the wrestler R, is related to a wrestler ID 21 of the wrestler R. Each value of the battle parameter represents a basic ability of the wrestler R to be set inherent to the wrestler R.

As shown in FIG. 6B, in the technique information 30, each value of a power 32, a speed 33, a technique 34, the highest damage degree 35, a consumption cost 36, and a level 37, which are technique parameters of the technique W, is related to a technique ID 31 of each technique W. The power 32, the speed 33, and the technique 34 represent abilities of the wrestler R to be required in order to use the technique W. The highest damage degree 35 represents the largest damage degree which can be given to an opponent. The consumption cost 36 represents a cost in hand to be required when using the technique W. The cost in hand will be described later. The level 37 represents to which level among a small technique, a middle technique, and a big technique each technique belongs. A level 1 represents the small technique, the level 2 represents the middle technique, and the level 3 represents the big technique, respectively. Further, it is determined that "receive" of only receiving the technique W is also included in the technique.

Shop registered information 40 shown in FIG. 7 is an example of a table representing to which shop TTT each wrestler R prepared in the game system GS belongs. Thereby, the storage part 2 functions as the registered data storing device. In the shop registered information 40, a registered shop ID 41, a registered association 42, and a registered fever degree 43 are stored in relation to the wrestler ID of each wrestler R. The registered shop ID 41 is a shop ID of a shop TTT to which the wrestler R belongs. The registered fever degree 43 is the highest value of the fever degree achieved by the wrestler R, and the registered association 42 is a name of the registered association of the wrestler R who achieves the registered fever degree 43.

For example, the case of the wrestler A will be explained below. When "the wrestler A" of "PP PROWRES" has the highest value "150" of the fever degree at the game machine G of "the shop TTT2", the registered shop ID 41 represents "the shop TTT2", the registered association 42 is stored as "PP PROWRES", and the registered fever degree 43 is stored as "150". This means that the wrestler A belongs to the shop TTT2. Further, the shop registered information 40 of the wrestler R which is not used by any player P has vacant columns and the registered fever degree 43 is 0. In addition, in the shop other than the shop TTT to which the wrestler R belongs, it is possible to play the battle game using the wrestler R.

Information for shop 50 shown in FIG. 8 is an example of a table representing an aggregate calculation of the total number of wrestler held by each shop TTT. The number of obtained wrestlers 51 is related to each shop ID. The number of obtained wrestlers 51 can be obtained by totaling the shop registered information 40 for each shop.

Figure 9:
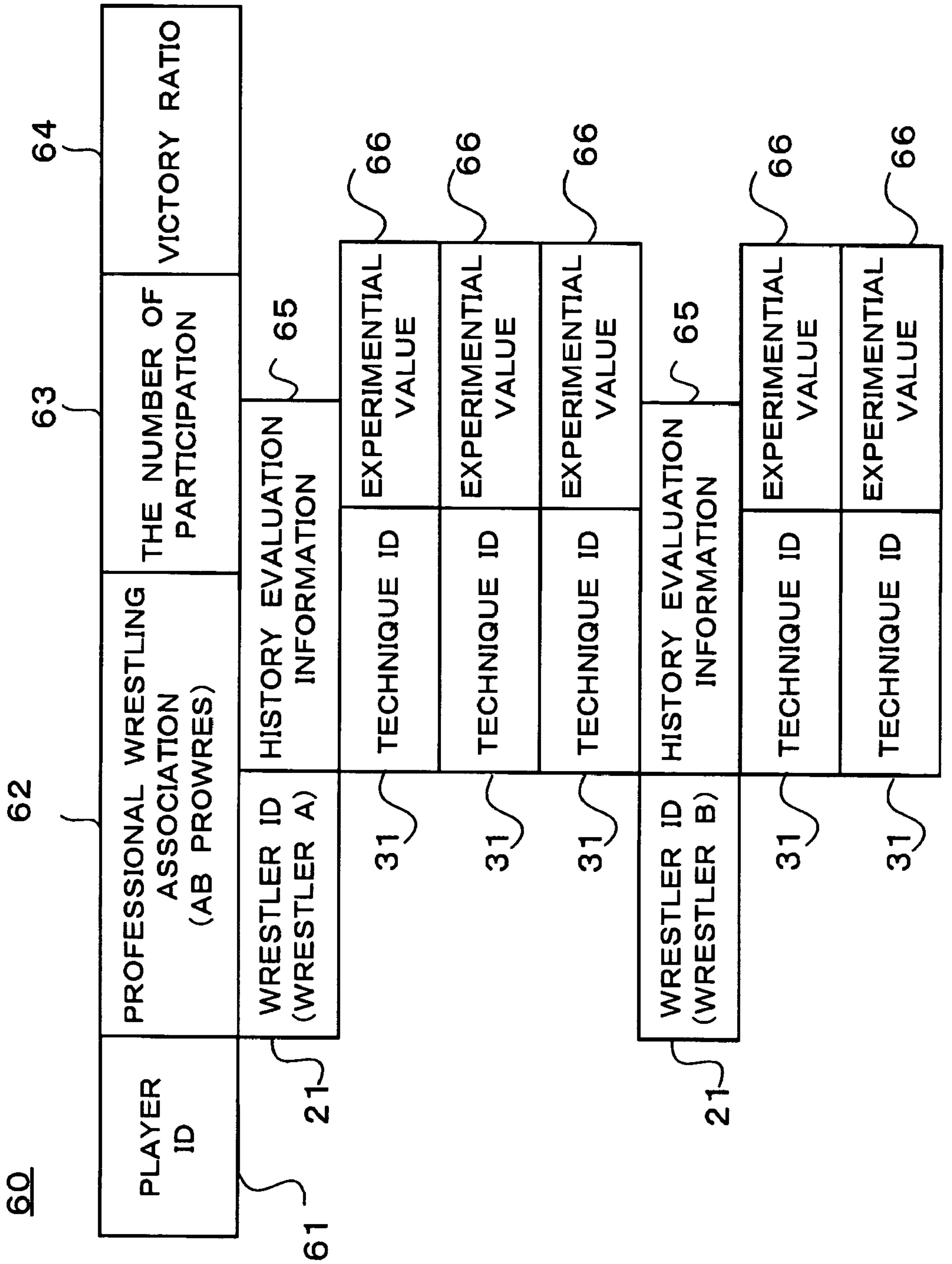
FIG. 9 is a view showing player information.

Further, the storage part 2 holds player information 60 with respect to each player P. An example of the player information 60 is shown in FIG. 9. In the player information 60, the information relevant to the player P is related to a player ID 61 unique to the player. The player information 60 includes a professional wrestling association 62 managed by the player P, the number of participation 63 that the player P participates in the game, a victory ratio 64 of the game, and a plurality of wrestler ID 21. History evaluation information 65 and a plurality of technique IDs 31 . . . 31 are related to each wrestler ID 21, and an experimental value 66 is related to each technique ID 31.

The wrestler ID 21 included in the player information 60 represents a wrestler ID of a wrestler who is registered in a professional wrestling association 62 of the player P, and each wrestler ID 21 can use in the game the technique of the corresponding technique ID 31. According to the example shown in FIG. 9, the player P manages an AB PROWRES, the wrestler A and the wrestler B are registered in this AB PROWRES, and three kinds of techniques and two kinds of techniques are related to the wrestler A and the wrestler B, respectively. As a result, in the game, the wrestler A can use three kinds of techniques, and the wrestler B can use two kinds of techniques. The experimental value 66 is a parameter representing what percentage of the highest damage degree 35 can be given to the opponent when each wrestler uses the technique against the opponent.

The history evaluation information 65 is the information relating to a history of an evaluation item of the corresponding wrestler. In the present embodiment, the history evaluation information 65 is configured by two evaluation items, namely, a show emphasis degree and a victory emphasis degree. The show emphasis degree is an item for evaluating a degree to emphasize amusingness as a professional wrestling rather than victory or defeat of the game in the game of the professional wrestling, and the victory emphasis degree is an item for evaluating a degree to emphasize victory or defeat of the game rather than amusingness as a professional wrestling in the game of the professional wrestling. Each of the evaluation items are formed by evaluation from the opponent after the match.

When the card reading part 11 of the game machine G reads the wrestler ID 21 of the wrestler card R, the information relating to the wrestler R held by the game machine G can be used through the wrestler ID 21 as a key. In addition, by reading the technique ID 31 of the technique card W, the information relating to the technique W held by the game machine G can be used through the technique ID 31 as a key.

In order to register of the wrestler ID 21 and the technique ID 31 in the player information 60, for example, a player may select a predetermined registration mode to register the wrestler R and the technique W of this wrestler R to be registered in his/her own professional wrestling association. In the present embodiment, a predetermined registration fee is collected from the professional wrestling association which is managed by the player P in this case.

Figure 10:
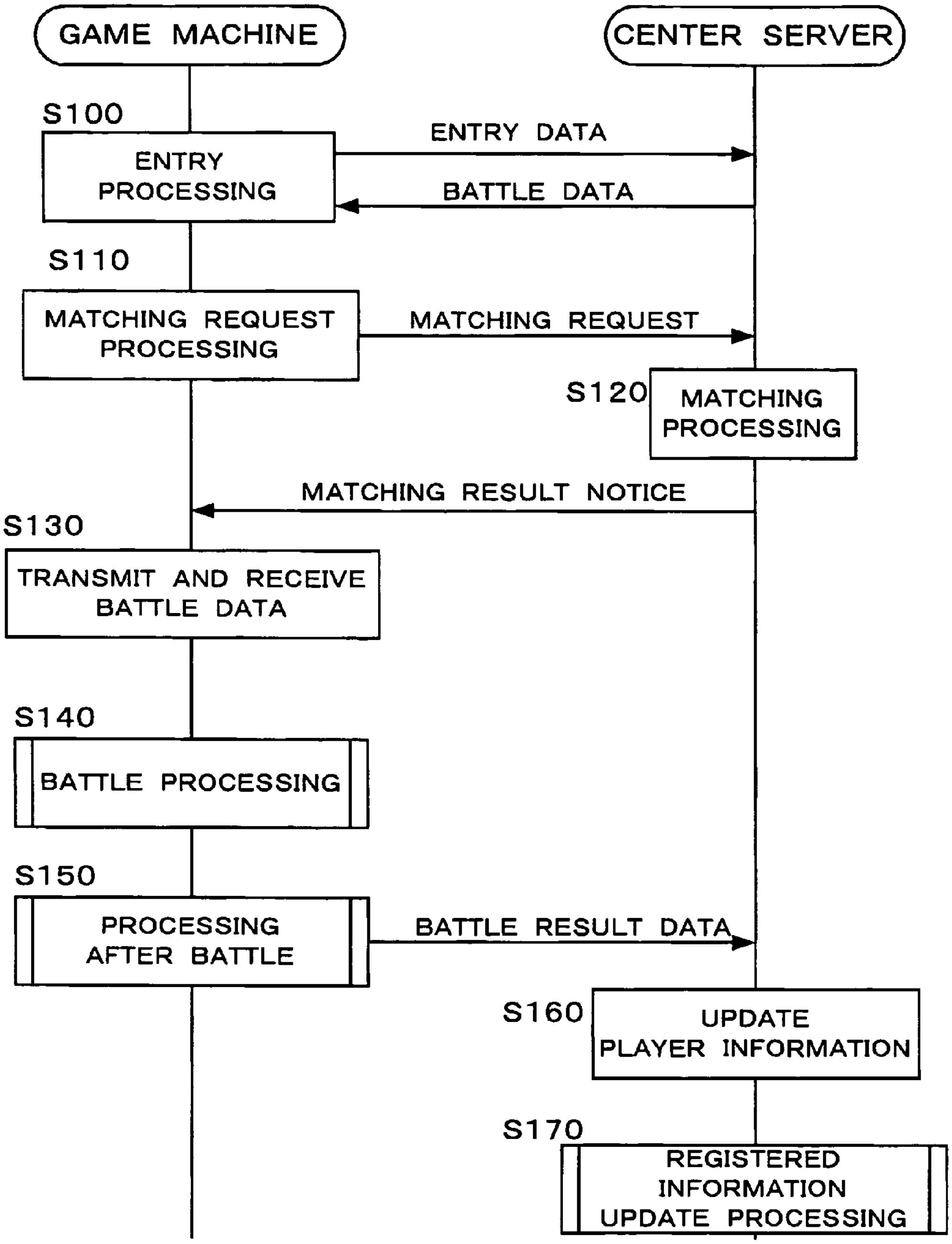
FIG. 10 is a sequence view showing the outline of the processing of a game machine and a center server machine.

Hereinafter, based on the examples of FIG. 2A and FIG. 2B, a flow of the processing that the shop to which the wrestler A belongs is updated from the shop TTT2 to the shop TTT4 will be described with reference to a sequence view of FIG. 10. In the present embodiment, the player P4*a* who operates the game machine G4*a* of the shop TTT4 selects the wrestler A as a starting wrestler and plays a battle game. The wrestler A belongs to the shop TTT2 with a registered fever degree 150. Accordingly, if the player P4 can get a fever degree more than 150, it is possible for the wrestler A to belong to the shop TTT4. Hereinafter, the game machine G4*a* to be operated by the player P4*a* will be described. The similar processing will be also carried out in the game machine G1*a* of the player P1*a* who is determined as an opponent of the battle game by the matching processing to be described later. The processing of the game machine G4*a* is controlled by the control part 17 and the processing of the center server machine CS is controlled by the control part 3.

First, the player P4*a* carries out predetermined entry operation to the game machine G4*a* of the shop TTT4, thereby, the entry processing is carried out (step S100). As the entry operation, the player P4*a* makes the entry card input part 12 read the entry card having the player ID61 stored therein and makes the card reading part 11 read the wrestler card R of the wrestler A. Thereby, the wrestler A is set as a starting wrestler of the battle game, namely, the wrestler's wrestler ID is set as an operation object in the RAM 19*a*. This leads to that the control part 17 functions as operation object setting device and the RAM 19*a* functions as game machine storing device.

When the player ID 61 of the player P4*a* is read by the game machine G4*a* through the entry card and the wrestler ID 21 of the wrestler A is read by the game machine G4*a* through the wrestler card R, respectively, the game machine G4*a* transmits the IDs 61 and 21 to the center server CS as entry data.

When receiving the entry data, with reference to each of ID 61 and ID 21 included in the entry data, the center server CS extracts the player information 60 related to the player ID 61 and the wrestler information 20 related to the wrestler ID 21 from the storage part 2, respectively. The center server CS further extracts from the player information 60 the professional wrestling association 62, the number of participation 63, the victory ratio 64, and respective information 65, 66, and 31 related to the wrestler ID 21 included in the entry data. Hereinafter, the player information 60 extracted by this processing is referred to as the player information 60 of the player P4*a*. Further, the technique information 30 related to all technique ID 31 included in the player information 60 of the player P4*a* will be extracted.

Then, the player information 60 of the player P4*a*, the wrestler information 20, and the technique information 30 obtained by the above mentioned extraction processing are transmitted to the game machine G4*a*. Hereinafter, the player information 60, the wrestler information 20, and the technique information 30 to be transmitted from the center server machine CS to the game machine G in the entry processing is collectively called as the battle data. The game machine G4*a* stores the received battle data in the game data storage part 14. In this case, to the wrestler information 20 and the technique information 30 included in the received battle data, the player ID 61 of the player P4*a* is related, respectively. Hereinafter, battle data related to the player ID 61 of the player P4*a* is referred to as "battle data of the player P4*a*". Then, the entry processing is terminated.

When receiving the battle data of the player P4*a*, the game machine G4*a* carries out matching request processing (step S110). In the matching request processing, a matching request including the player ID 61 of the player P4*a*, the wrestler ID 21 of the wrestler A, and the history evaluation information 65 of the wrestler A is transmitted to the center server machine CS. When receiving the matching request, the center server machine CS carries out the matching processing (step S120). In the matching processing, based on the history evaluation information 65 included in the matching request, the players who have the same tendencies of a match are determined as opponents. The players having the similar evaluations in the show emphasis degree and a victory emphasis degree may be combined as opponents.

In the present embodiment, the case where the player P1*a* is determined as the opponent of the player P4*a* in the matching processing will be described. When the opponent is determined, a matching result notice to notice the opponent will be transmitted to the players P4*a* and P1*a* to battle with each other from the center server CS. The matching result notice includes an address of the player P to be the opponent. Hereinafter, the player P1*a* is sometimes referred to as the opponent P1*a*.

When receiving the matching result notice, the game machine G4*a* transmits its own battle data to the opponent P1*a* included in the received matching result notice, receives the battle data of the opponent P1*a* transmitted from the opponent P1*a*, and stores this battle data in the game data storage part 14 (step S130) Subsequently, the battle processing is carried out (step S140) When the opponent P1*a* designates the wrestler B, in the battle processing, a professional wrestling game that the wrestler A and the wrestler B battle with each other will be carried out. In the match, according to the actions of respective professional wrestlers A and B selected by respective players P1*a* and P4*a*, the fever degree is calculated. The details of the battle processing will be described later.

If the battle processing is terminated, the processing after battle will be carried out (step S150). According to the processing after battle, the contents of play of the opponent P is evaluated and battle result data including the evaluation information and the fever degree is transmitted to the center server machine CS as the game machine data. Thereby, the control part 17 and the communication part 13 of the game machine G4*a* functions as a game machine data transmitting device. The center server machine CS receives the game machine data to update the player information 60 in the storage part 2 based on the received battle result data (step S160). This leads that the control part 3 and the communication part 1 of the center server machine CS function as a game machine data receiving device. Subsequently, the shop registered information 40 and the information for shop 50 are also updated (step S170). In the case where the fever degree included in the battle result data transmitted from the game machine G4*a* is larger than the registered fever degree 43 of the wrestler A, the registered information related to the wrestler A is updated and the wrestler A belongs to the shop TTT4 in which the game machine G4*a* is installed. Basically, this leads to that the shop TTT4 obtains the wrestler A. The registered information update processing will be described later.

Figure 11:
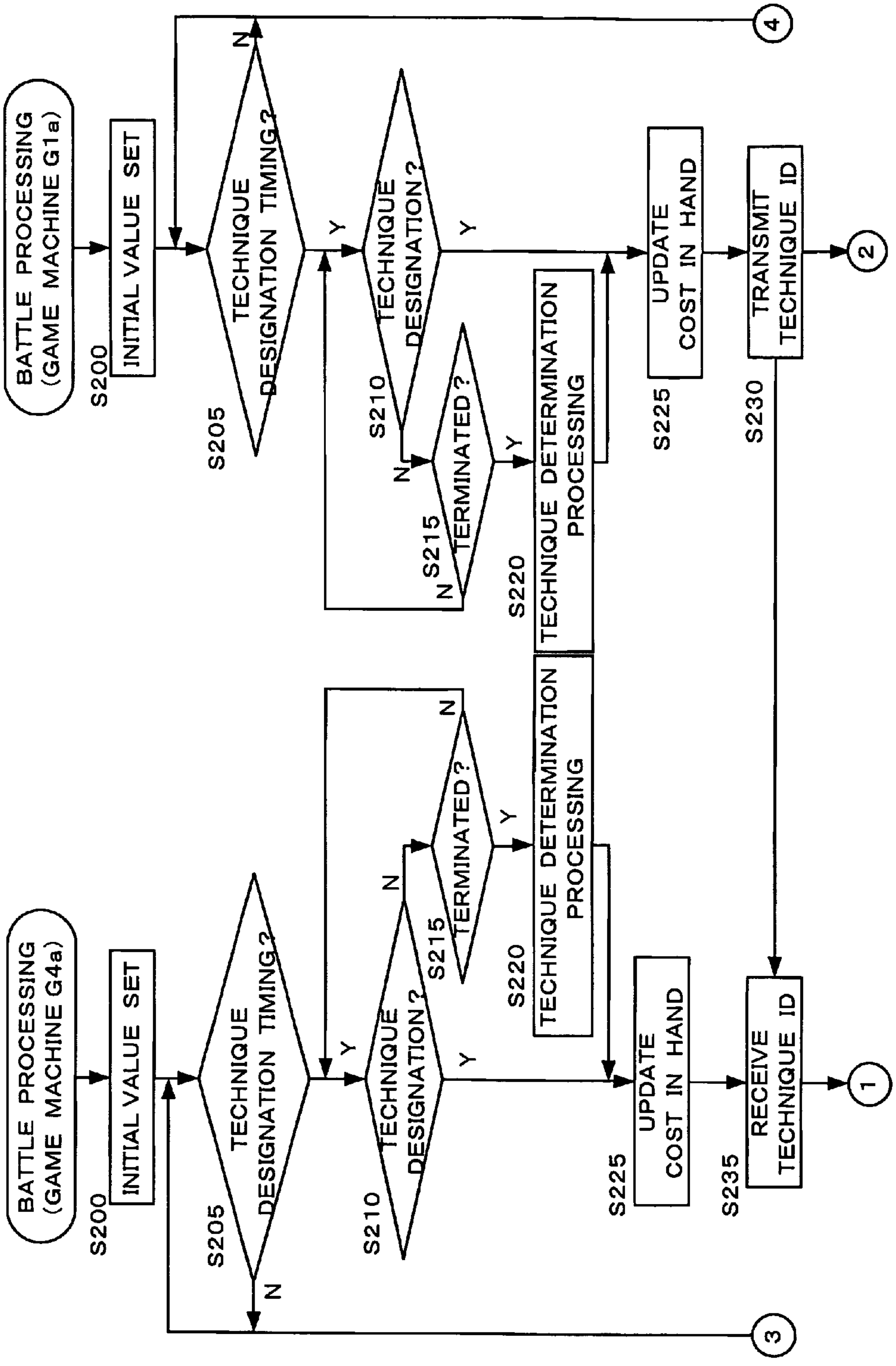
FIG. 11 is a flow chart showing a flow of battle processing to be performed by the game machine.
Figure 12:
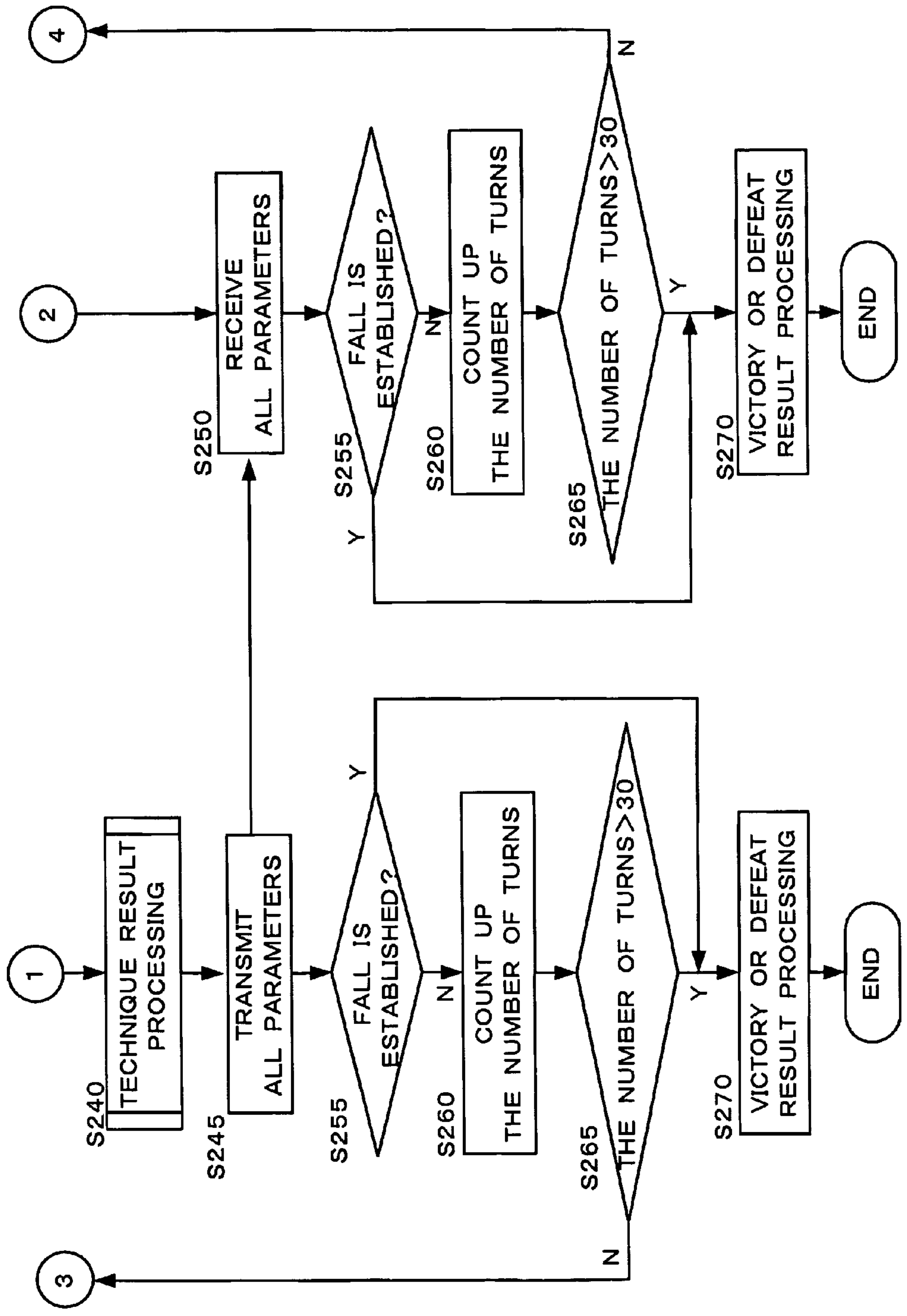
FIG. 12 is a flow chart showing the processing continued from FIG. 11.
Figure 13:
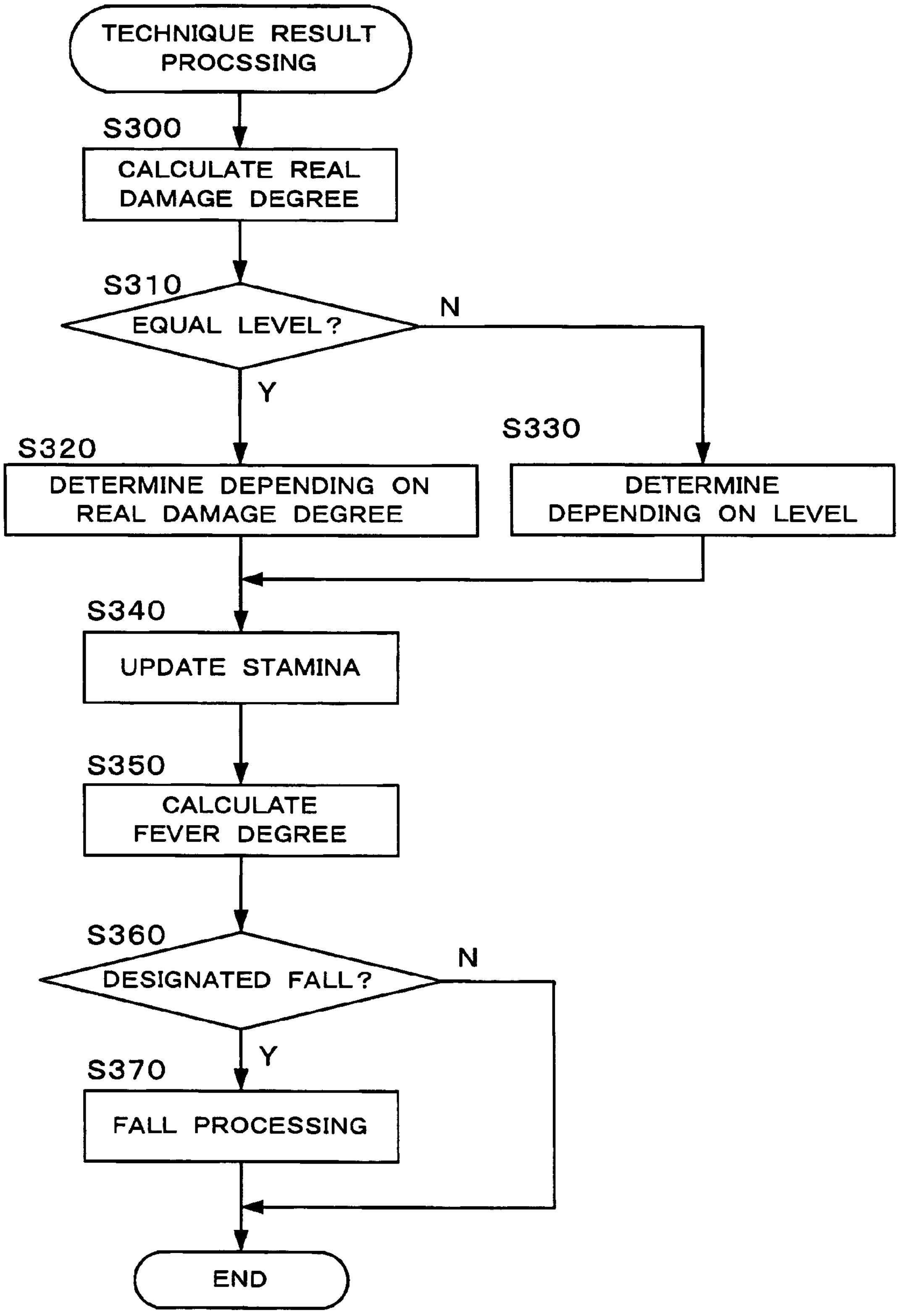
FIG. 13 is a flow chart showing a flow of technique result processing to be carried out by the game machine.

The battle processing to be performed between the wrestler B of the player P1*a* and the wrestler A of the player P4*a* will be described with reference to flow charts shown in FIGS. 11 to 13. The battle processing is carried out by the control part 17 of each game machine G. Thereby, the control part 17 functions as a game control device. In the present embodiment, mediating a compromise between the game machines G1*a* and G4*a* with each other, the game machine G4*a* becomes a game server and the game machine G1*a* becomes a game client.

Hereinafter, unless a particular note is made, when using each data included in the battle data of the player P4*a* at the game machine G4*a*, through the player ID 61 of the player P4*a* as a key stored in the game data storage part 14 of the game machine G4*a*, the data related to the player ID 61 is used; and when using each data included in the battle data of the opponent P1*a* at the game machine G4*a*, through the player ID 61 of the opponent P1*a* as a key stored in the game data storage part 14 of the game machine G4*a*, the data related to the player ID 61 is used.

Since the similar processing is carried out in the game machine G1*a* and the game machine G4*a*, the processing for the game machine G4*a* will be mainly described unless a particular note is made. Further, the processing at the game machine G4*a* and the processing at the game machine G1*a* are appropriately synchronized according to a conventional and well-known method. First, an initial value of parameters for a game is set (step S200). The parameters for the game include parameters for the wrestler A, various timers, the number of turns, and flags or the like. The parameters for the wrestler A include a stamina, a cost in hand, and a fever degree. The initial value of the stamina is a value of the bodily power 26 of the wrestler A and this initial value is reduced according to attacks from the opponent. The stamina for the opponent B is also held so as to be recognized in the game.

The cost in hand is a cost for using the technique W and a predetermined value is given in advance as the initial value. This initial value is reduced according to the value of the consumption cost 36 of the used technique W and the technique W having the larger consumption cost 36 than the cost in hand cannot be used. The timers include a game timer and a timing timer. The game timer is a timer for clocking a match elapsed time. The control part 17 judges which part among the opening part, the middle part, and the end part the moment of the present game is at depending on the elapsed time of the game timer.

Timing that the wrestler R can use the technique, namely, timing that the player P should designate the technique is referred to as technique designation timing, and in the present embodiment, the technique designation timing can be given up to thirty times in one game. The timing timer clocks the technique designation timing, which is set to a predetermined time period in advance. The number of turns is a parameter for counting the number of technique designation timing assuming that one time of the technique designation timing makes one turn and the initial value is 0. As described above, the fever degree is a quantified evaluation for the action of the wrestler R selected by the player P. The initial value is 0 and it is calculated for each turn. A calculation method of the fever degree will be described later.

After setting the initial value of each parameter, it is determined if the moment is the technique designation timing which can designate the technique W or not (step S205). Then, if the moment is determined to be the technique designation timing, the timing timer starts counting. Next, it is determined if the technique W is designated or not (step S210). If the player P4*a* makes the card reading part 11 of the game machine G4*a* read any technique card W, this technique W is determined to be designated. In the case where the timing is determined not to be the technique designation timing in the step S205, the technique designation timing is waited. The technique designation timing is controlled so as to appear at predetermined intervals in the battle game.

When determined that the technique W is designated by the player P4*a* at the step S210, the process proceeds to step S225. When determined that there is no designation of the technique W, it is determined if the technique designation timing is terminated or not (step S215). When the timing timer is terminated, it is determined that the technique designation timing is terminated. When the technique designation timing is determined not to be terminated, returning to the step S210, the technique designation is waited, and when the technique designation timing is determined to be terminated, the process proceeds to the technique determination processing (step S220). In the technique determination processing, the control part 17 of the game machine G4*a* determines the technique W in place of the player P4*a*.

As described above, due to designation of the player P4*a* or the technique determination processing, the technique W of the player P4*a* is determined. Hereinafter, the technique W determined for the player P4*a* is referred to as a technique WA. In addition, the technique of the player P1*a* is determined in the same way. Hereinafter, the technique W determined for the player P1*a* is referred to as a technique WB.

After the technique determination processing, the cost in hand is updated in such a manner that the consumption cost of the technique WA is subtracted from the cost in hand of the wrestler A (step S225). After that, reception of the technique ID 31 of the technique WB of the player P1*a* from the game machine G1*a* is waited. On the other hand, the game machine G1*a* transmits the technique ID 31 of the technique WB to the game machine G4*a* after the technique WB is determined and the cost in hand of the wrestler B is updated (step S230). The game machine G4*a* receives the technique ID 31 transmitted from the game machine G1*a* (step S235) and carries out the technique result processing (step S240). In the technique result processing, based on each technique information 30 of the technique WA and the technique WB, it is determined which technique W has won in its turn. The technique result processing will be described later.

When the technique result processing is terminated, all parameters used in the battle game are transmitted from the game machine G4*a* to the game machine G1*a* (step S245), the game machine G1*a* receives all parameters transmitted from the game machine G4*a* (step S250). After transmission and reception of all parameters, it is determined if a fall is established or not in each of the game machines G1*a* and G4*a* (step S255). Whether a fall is established or not is determined depending on a status of a flag representing establishment of the fall in the technique result processing to be described later.

When determined that the fall is established, if the player P4*a* establishes the fall, for example, the player P4*a* is determined as "a winner" and the opponent P1*a* is determined as "a loser" to perform a victory or defeat result processing (step S270). In the step S255, if it is determined that the fall is not established, the number of turns is counted up by one (step S260). Subsequently, it is determined if the number of turns exceeds 30 or not (step S265). Then, if it is determined that the number of turns does not exceed 30, the processing returns to the step S205 to carry out the next technique designation timing, and if it is determined that the number of turns exceeds 30, the processing proceeds to the victory or defeat result processing of the step S270. In the victory or defeat result processing, a victory or defeat result is displayed on a monitor 15 based on the parameters used in the battle game.

The technique result processing will be described with reference to a flow chart of FIG. 13. The technique result processing is carried out by a control part G17 of the game machine G., with respect to each of the technique WA and the technique WB, a real damage degree is calculated (step S300). The real damage degree of the present embodiment is calculated by (a basic damage degree×a modified damage ratio). The basic damage degree is a damage degree that can be realized by the wrestler R in the highest damage degree 35 and this basic damage degree can be obtained by (the highest damage degree 35 of the technique W×the experimental value 66). The modified damage ratio is a value calculated in consideration of the status of the opponent and the player himself or herself when the technique W is used and a method of calculating the modified damage ratio is set so that various parameters used in the match can be appropriately reflected. This makes it possible to obtain the real damage degree in consideration of the experimental value 66 and the status at the moment when the technique W is used.

Next, it is determined if the level of the technique WA is equal with the level of the technique WB or not (step S310). Then, if they are equal, the determination is made depending on the calculated real damage degree (step S320). In the determination depending on the real damage degree, it is determined that the technique W having the larger real damage degree wins. If the levels are different, the determination is made depending on the level (step S330). In the present embodiment, a strong and weak relation of the level 37 of the technique W is set as a level 1<a level 2<a level 3<a level 1. In accordance with this relation, it is determined which technique W wins. In the present embodiment, the technique WA of the player P4*a* wins. Next, the stamina of the opponent B defeated by the technique WA is updated (step S340). For example, the real damage degree of the technique WA is subtracted from the stamina of the wrestler B.

Subsequently, the fever degree is calculated (step S350) Thereby, the control part 17 functions as an evaluating device. The fever degree of the present embodiment is calculated by combination of a basic evaluation and an intergradation evaluation. Further, a basic evaluation is obtained by combination of a situation evaluation and a skill evaluation. A situation evaluation is an evaluation with respect to "when and which technique is used", and this situation evaluation is obtained according to the method of the steps; Assuming various situations (scenes) in advance, making third persons evaluate each scene, and holding a scene evaluating table in the game data storage part 14, where a scene evaluation point based on the evaluations is related to each of the situations. Then, the scene evaluation point related to the situation corresponding to the action selected by the player P is specified as the situation evaluation to the action. For example, when a scene evaluation point 100 is related to the situation of "a big technique (a level 3) is used in the opening part" in the scene evaluating table, if the player P selects and designates the big technique in the opening part in the battle game, the evaluation point in this scene is 100.

On the other hand, the skill evaluation is carried out by a method of evaluating a basic game skill by quantitatively examining the basic skill. For example, when it is determined that the operation of himself or herself is decided by estimating the operation of the opponent P to be carried out in order to win the game, a high evaluation can be obtained. For example, the conditions to specify the height of the game skill are set stepwise in advance, and a skill evaluating table where the skill evaluating point is related to each step is held in the game data storage part 14. With reference to the skill evaluating table for each turn, a skill evaluation point related to the condition for the action selected by the player P is specified as the skill evaluation for the action.

The intergradation evaluation is an evaluation with respect to the intergradation amount of the basic evaluation of the former turn and the basic evaluation of the present turn. An intergradation evaluating table where the intergradation evaluation point is related to the intergradation amount is held in the game data storage part 14. Calculating the intergradation amount of the basic evaluation for each turn and referring to the intergradation evaluating table, the intergradation evaluation point related to the calculated intergradation amount is specified as the intergradation evaluation. Further, the calculated basic evaluation and the calculated fever degree of each turn are stored in the RAM 19*a*.

Subsequently, it is determined if there is a designation of fall or not (step S360). For example, when a fall button is pressed during the technique designation timing, it is determined that there is a designation of fall. When judged that there is a designation of fall, a fall processing is carried out (step S370). In the fall processing, it is determined if the fall is established or not. Then, when it is determined that the fall is established, a flag representing establishment of the fall is placed. After the fall processing, the technique result processing is terminated. If there is no designation of fall, the technique result processing is terminated as it is.

In the present embodiment, the establishment of the fall is judged as follows. First, a random value is calculated. Then, when the updated stamina of wrestler R who is subject to the fall is smaller than the random value, it is determined that the fall succeeds and in other cases, it is determined that the fall fails. For example, a parameter with respect to success of fall, prepared in advance, is set at 1 when the fall succeeds and the parameter is set at 0 when the fall fails. This makes it possible to determine if the fall succeeds or not depending on whether the parameter with respect to success of fall is 1 or 0.

Figure 14:
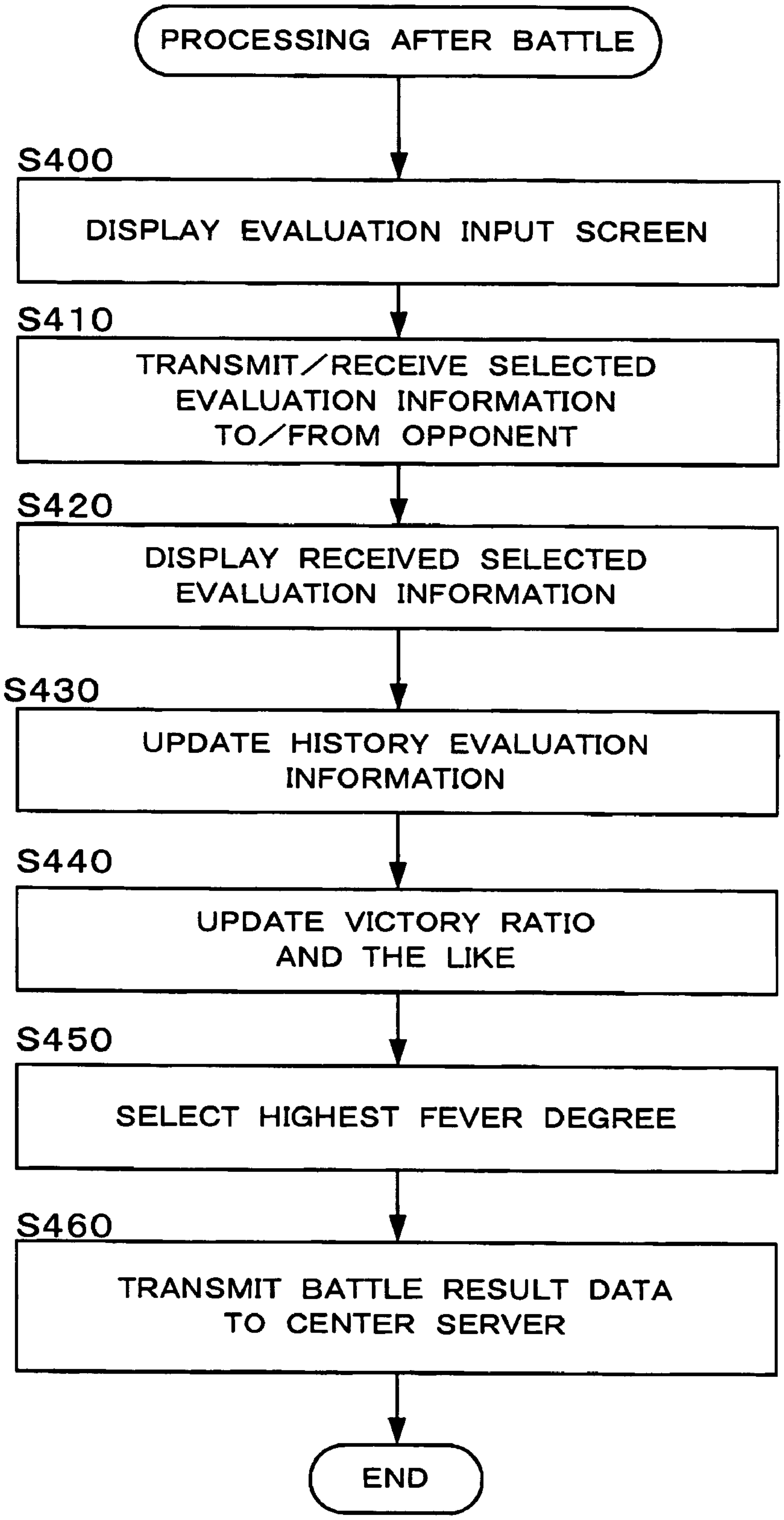
FIG. 14 is a flow chart showing a flow of processing after battle to be performed by the game machine.

The processing after battle to be performed after the end of battle processing will be described with reference to a flow chart of FIG. 14. The processing after battle is controlled by the control part 17 of each game machine G where the battle processing is terminated. First, an evaluation input screen is displayed on the monitor 15 (step S400). Since the evaluation with respect to the content of the play of the opponent P is displayed as a list on the evaluation input screen, the player P4*a* selects the evaluation with respect to each of two evaluation items which are the show emphasis degree and the victory emphasis degree for the opponent P1*a*.

The selected evaluation information including the selected evaluation is transmitted to the opponent P1*a*, the selected evaluation information transmitted to the player P4*a* from the player P1*a* is received (step S410). The received selected evaluation information is displayed on the monitor 15 (step S420). Based on the evaluation included in the selected evaluation information, the history evaluation information 65 of the wrestler A is updated (step S430). Next, the number of participation and the victory ratio of the player information 60 of the player P4*a* are updated (step S440). Then, the highest value among the fever degrees of each turn stored in the RAM 19*a* is selected as the fever degree of this game (step S450). The control part 17 transmits the battle result data including the updated player information 60, the shop ID of the shop TTT4 and the selected fever degree to the center server machine CS (step S460). Thereby, the control part 17 and the communication part 13 functions as a game machine data transmitting device. Thus, the processing after battle is terminated.

Figure 15:
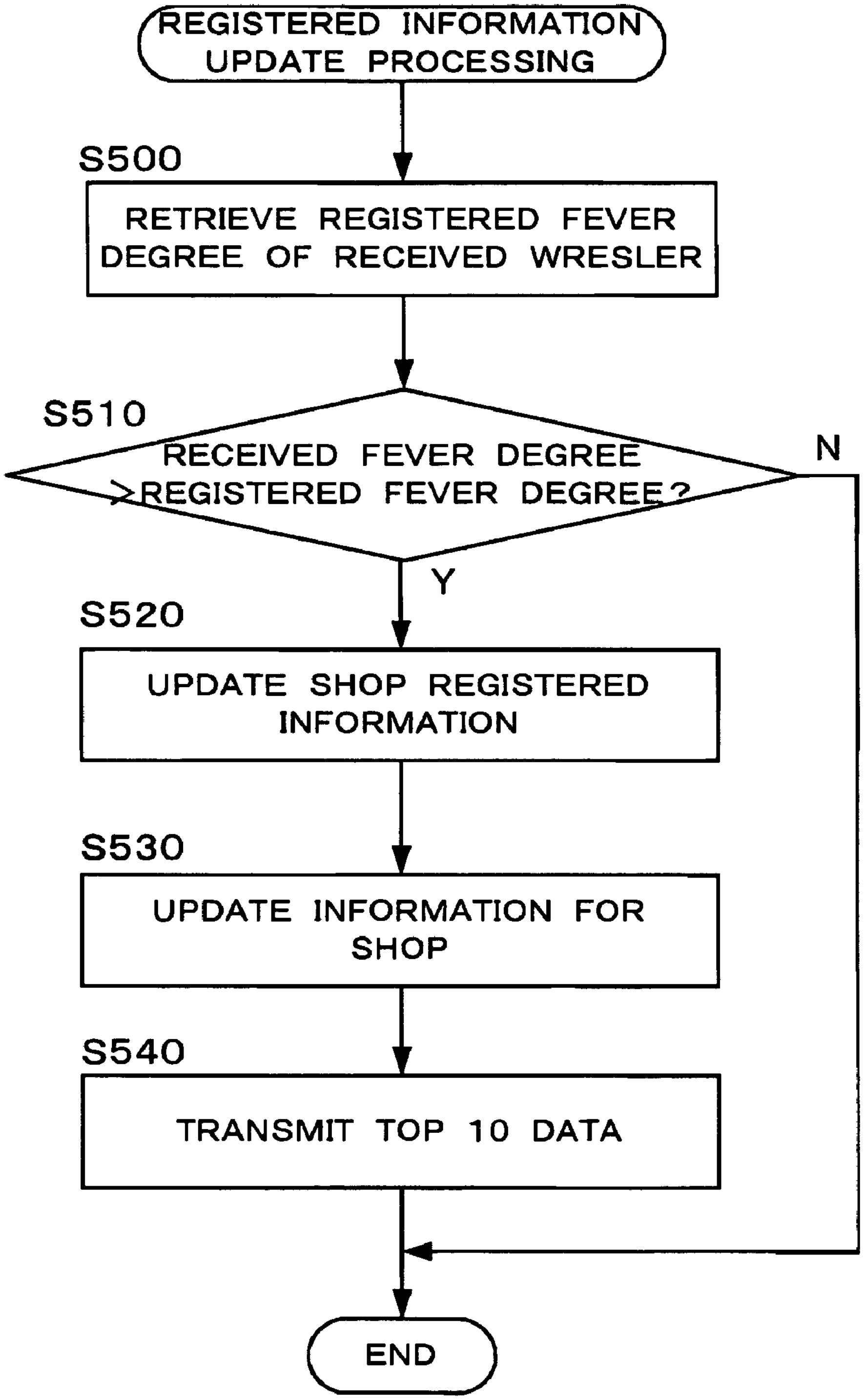
FIG. 15 is a flow chart showing a flow of registered information update processing to be performed by the center server machine.

The registration information update processing will be described according to a flow chart shown in FIG. 15. The registration information-update processing is controlled by the control part 3 of the center server machine CS. First, thorough the wrestler ID included in the battle result data as a key, the control part 3 retrieves the registered fever degree 43 of this wrestler from the shop registered information 40 (step S500) In the present embodiment, the control part 3 retrieves the registered fever degree 43 of the wrestler A. Next, it is determined if the fever degree included in the battle result data (hereinafter, referred to as "a received fever degree") is larger than the registered fever degree 43 or not (step S510), and then, if it is determined that the received fever degree is larger than the registered fever degree 43, the control part 3 updates the shop registered information 40 with respect to the wrestler A (step S520). An association ID and a shop ID can be obtained from the battle result data.

In the case of the present embodiment, assuming that the received fever degree is 200, the shop registered information 40 is updated as shown in FIG. 16A. This results in that the shop TTT4 takes the wrestler A from the shop TTT2 and the shop TTT2 loses the wrestler A who was owned by the shop TTT2. Subsequently, the number of wrestlers belonging to a shop is collected for each shop, and the information for shop 50 is updated (step S530), and the information for shop 50 of top 10 shops to each shop server TS is transmitted, and the information based on the information for shop 50 transmitted to each shop server TS is displayed on a center screen SR (step S540).

The updated information for shop 50 is shown in FIG. 16B. In the information for shop 50 after update, as compared to that before update, the number of the obtained wrestlers 51 of the shop TTT2 is reduced by one and the number of the obtained wrestlers 51 of the shop TTT4 is increased by one. Due to the processing in the steps S500 to S520, the control part 3 functions as a registration updating device.

As described above, a special privilege is given to the shop TTT registered in the shop registered information 40 as the shop TTT holding the wrestler R. In the present embodiment, for example, when the player P newly registers the wrestler A in the association managed by himself or herself at the game machine G installed in the shop TTT holding the wrestler A, the special privilege is given to the shop TTT so that the processing is carried out to make a registration fee collected for registering the wrestler A cheaper than a normal case. This leads to that a new registration of the wrestler A in the shop TTT by the player P who wishes to register the wrestler A is highly expected. In this way, by employing this system, the evaluation result is reflected on all game machines G installed in the shop TTT. A common sense in a shop TTT can be formed so that the players P in the shop TTT want the same special privilege for other wrestler R. Then, a sense of being a member of the players P in the same shop can be improved.

Figure 17:
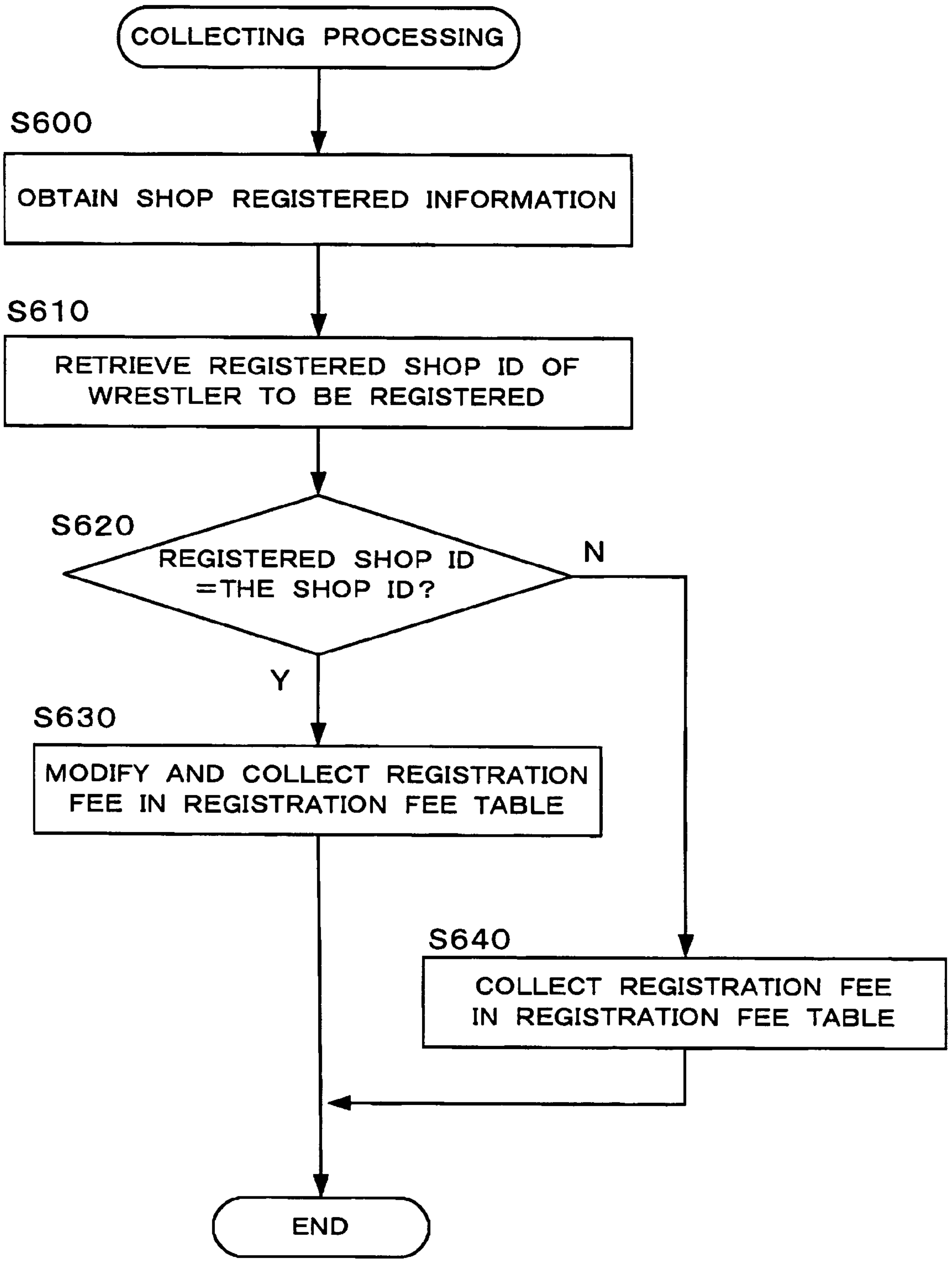
FIG. 17 is a flow chart showing a flow of collecting processing.

The collecting processing to be carried out in the game machine G of the shop TTT4 upon collection of the registration fee of the wrestler A will be described with reference to FIG. 17. The collecting processing is carried out in a registration mode capable of registering the wrestler A in the association managed by the player P. Thereby, the control part 17 functions as a game machine processing device. Further, a registration fee table where each wrestler R and the previously arranged registration fee of the wrestler R are related to each other is obtained from the storage part 2 of the center server machine CS to be held in the game data storage part 14 in advance. First, the shop registered information 40 is obtained from the storage part 2 of the center server machine CS to be held in the game data storage part 14 (step S600). Subsequently, in the obtained shop registered information 40, the registered shop ID 41 related to the wrestler A who is designated by the player P as the wrestler R to be registered is retrieved (step S610). By reading the wrestler card R of the wrestler A into the card reading part 11, the wrestler ID 21 of the wrestler A may be obtained to retrieve the registered shop ID 41.

In the shop registered information 40, it is determined if the registered shop ID 41 related to the wrestler A coincides with the shop ID of the player himself or herself, that is the shop ID of the shop TTT4, or not (step S620). When determined that they coincide with each other, that means the wrestler A belongs to the shop TTT4. Then, the registration fee related to the wrestler A in the registration fee table is subtracted by a predetermined discount rate to be collected (step S630). On the other hand, when they do not coincide with each other, that means the wrestler A belongs to other shop TTT. Then, the registration fee related to the wrestler A in the registration fee table is collected as it is (step S640).

The present invention is not limited to the embodiment but the present invention may be made in various embodiments. For example, after the registered information update processing, the center server CS may carry out the group special privilege processing. According to the group special privilege processing, the special privilege information to set a special privilege with respect to the wrestler A is transmitted to the shop TTT4 who has obtained the wrestler A, and the special privilege information to cancel the special privilege with respect to the wrestler A is transmitted to the shop TTT4 who has lost the wrestler A. Thereby, the control part 3 functions as a group processing device. Receiving the special privilege information, the game machines G1*a* and G4*a* carry out the game machine special privilege processing. For example, in the case where the special privilege related to the wrestler A is that the registration fee of the wrestler A is set to be lower than a normal case, at the game machines G of the shops TTT1 and TTT4, based on the received special privilege information, the registration fee of the wrestler A may be changed. For example, the registration fee related to each wrestler R is stored in the game data storage part 14 of the game machine G in advance, and only the registration fee with respect to the wrestler A may be changed.

The number of game machines installed in each shop TTT is not limited to three. The experimental value 66 of each technique may be updated by carrying out predetermined training processing with respect to each technique. The fever degree to be included in the battle result data may be a total value or an average value of the fever degree of each turn or may be a value when the game is over. In addition, plural versions of the wrestler information 20, which are different from each other, may be provided to one wrestler A. In this case, the wrestler cards R according to the versions are prepared and the wrestler ID different from each other is set for each version of the wrestler to identify the version of wrestler. The content of the information for shop 50 is appropriately obtained from the shop registered information 40 and there is no need to store this content of the information for shop 50 as the storage information.

What is claimed is:

1. A game system comprising:

a server and a plurality of game machines connected to the server, wherein each of the game machines is associated with one of a plurality of groups, and a game using at least one game element is played among the game machines, wherein each of the game machines includes:

a game machine storing device for storing group information representing the associated group and game element information representing the game element;

a game control device for controlling the game using the game element;

an evaluating device for obtaining an evaluation of a content of play of the game based on an evaluation criterion determined in advance of the game; and a game machine data transmitting device for transmitting game machine data including the group information, the game element information, and the obtained evaluation to the server; and wherein the server includes:

a game machine data receiving device for receiving the game machine data from each of the plural game machines;

a registered data storing device for storing the game element information, registered group information representing a group holding a game element represented by the game element information, and a registered evaluation which is the evaluation obtained by any one of the game machines of the group represented by the registered group information as being related to each other; and a registration updating device for replacing the registered evaluation and the registered group information with the evaluation and the group information, respectively, included in the game machine data associated with one of the game machines where a play of the game was made when (i) the registration evaluation related to the game element information stored in the registered data storing device and (ii) the evaluation included in the game machine data associated with the one of the game machines where the play of the game was made satisfy a predetermined condition.

2. The game system according to claim 1, wherein the game is a battle game;

each one of the plural game machines further has an operation object setting device for setting the game element as an operation object of the one of the plural game machines;

the game control device controls the battle game that the game element of the operation object battles with the game element of the operation object of other one of the plural game machines; and the evaluation by the evaluating device is an evaluation to a content of play different from victory or defeat of the game.

3. The game system according to claim 2, wherein the game is a professional wrestling game and the evaluation by the evaluating device is an evaluation to a content of play in the professional wrestling game.

4. The game system according to claim 1, wherein each one of the plural game machines further has a game machine processing device for carrying out predetermined processing when the group information of the associated one of the plurality of groups is stored in the registered group information with reference to the registered data storing device of the server.

5. The game system according to claim 1, wherein the server has a group processing device for carrying out predetermined processing with respect to each one of the plural game machines associated with the one of the plurality of groups which is represented by the registered group information.

6. The game system according to claim 1, wherein each of the plural game machines is a game machine for commercial use and the group is a shop where at least one of the plural game machines is installed.

7. The game system according to claim 1, wherein the registration updating device changes the registered group information during the updating to represent one of the groups associated with one of the game machines where the play of the game was made if the one of the game machines where the play of the game was made is unassociated with the one of the groups holding the game element represented by the game element information.

8. The game system according to claim 1, wherein the game element is a character.

9. A game system comprising:

a server and a plurality of game machines connected to the server;

wherein each of the game machines is associated with one of a plurality of groups, and a game using at least one game element is played among the game machines;

wherein each of the game machines includes:

a game machine storing device for storing group information representing the associated group and game element information representing the game element;

a game control device for controlling the game using the game element;

an evaluating device for obtaining a numeric evaluation of a content of play of the game based on an evaluation criterion determined in advance of the game; and a game machine data transmitting device for transmitting game machine data including the group information, the game element information, and the obtained numeric evaluation to the server; and wherein the server includes:

a game machine data receiving device for receiving the game machine data from each of the plural game machines;

a data storing device for storing the game element information, wherein a numeric evaluation obtained by any one of the plurality of game machines is associated with at least one of the game elements;

an updating device configured to:

compare the numeric evaluation and the game element information included in the game machine data transmitted by one of the game machines with the numeric evaluation associated with the corresponding game element information on the data storing device; and if the numeric evaluation transmitted by one of the game machines is superior to the numeric evaluation associated with the corresponding game element information on the data storing device, associating the group associated with the game machine with the game element information on the data storing device;

wherein the group associated with the game element information is allowed to utilize the corresponding game element during play of the game during a period of time in which the group is associated with the game element information.

10. The game system according to claim 9, wherein the transmitted numeric evaluation is superior to the stored evaluation if the transmitted numeric evaluation is greater than the stored evaluation.

11. The game system according to claim 9, wherein:

the game is a battle game;

each one of the plurality of game machines further has an operation object setting device for setting the game element as an operation object of the one of the plural game machines;

the game control device controls the battle game that the game element of the operation object battles with the game element of the operation object of other one of the plural game machines; and the numeric evaluation by the evaluating device is a numeric evaluation a content of play different from victory or defeat of the game.

12. The game system according to claim 11, wherein the game is a professional wrestling game and the numeric evaluation by the evaluating device is a numeric evaluation of a content of play in the professional wrestling game.

13. The game system according to claim 9, wherein each one of the plural game machines further has a game machine processing device for carrying out predetermined processing when the group information of the associated one of the plurality of groups is stored in the registered group information with reference to the registered data storing device of the server.

14. The game system of claim 9, wherein the game element is selected from the group consisting of: a character, a technique, and a privilege.

15. The game system according to claim 9, wherein the group previously associated with game element is replaced by the group associated with the game machine.

16. A method of operating a game system server in connection with a plurality of game machines, wherein each of the game machines is associated with one of a plurality of groups and a game using at least one game element is play among the game machines, the method comprising:

storing game element information on the server, wherein a numeric evaluation obtained by any one of the plurality of game machines is associated with at least one of the game elements;

receiving game machine data on the server from one of the game machines, the game machine data including group information, game element information, and a numeric evaluation of play of the game;

utilizing the server to compare the numeric evaluation and the game element information included in the game machine data transmitted by one of the game machines with the numeric evaluation associated with the corresponding game element information stored on the server; and if the numeric evaluation transmitted by the game machine is superior to the numeric evaluation associated with the corresponding game element information stored on the server, associating the group associated with the game machine with the game element information stored on the server;

wherein the group associated with the game element information is allowed to utilize the corresponding game element during play of the game during a period of time in which the group is associated with the game element information.

17. The method of claim 16, wherein the game element is selected from the group consisting of: a character, a technique, and a privilege.

18. The method according to claim 17, wherein the transmitted numeric evaluation is superior to the stored evaluation if the transmitted numeric evaluation is greater than the stored numeric evaluation.

19. The method of according to claim 17, wherein the game is a professional wrestling game and the numeric evaluation is a numeric evaluation of a content of play in the professional wrestling game.

20. The method of claim 17, wherein the group previously associated with game element is replaced by the group associated with the game machine.

* * * * *